(12) United States Patent
Song et al.

(10) Patent No.: US 12,008,240 B2
(45) Date of Patent: Jun. 11, 2024

(54) RANDOM WRITE METHOD AND APPARATUS

(71) Applicant: INSPUR SUZHOU INTELLIGENT TECHNOLOGY CO., LTD., Jiangsu (CN)

(72) Inventors: Qi Song, Jiangsu (CN); Baolin Zhao, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/925,687

(22) PCT Filed: Jan. 23, 2021

(86) PCT No.: PCT/CN2021/073448
§ 371 (c)(1),
(2) Date: Nov. 16, 2022

(87) PCT Pub. No.: WO2021/238264
PCT Pub. Date: Dec. 2, 2021

(65) Prior Publication Data
US 2023/0342038 A1  Oct. 26, 2023

(30) Foreign Application Priority Data
May 29, 2020  (CN) .......................... 202010472997.6

(51) Int. Cl.
*G06F 3/06* (2006.01)
*G06F 12/02* (2006.01)
*G06N 3/0442* (2023.01)

(52) U.S. Cl.
CPC .......... *G06F 3/0613* (2013.01); *G06F 3/0653* (2013.01); *G06F 3/0679* (2013.01);
(Continued)

(58) Field of Classification Search
None
See application file for complete search history.

(56) References Cited

U.S. PATENT DOCUMENTS

| 2013/0227246 A1* | 8/2013 | Hirao | G06F 12/0246 711/206 |
| 2014/0173268 A1* | 6/2014 | Hashimoto | G11C 29/52 713/2 |

(Continued)

FOREIGN PATENT DOCUMENTS

| CN | 106775493 A | 5/2017 |
| CN | 110851317 A | 2/2020 |
| CN | 111708491 A | 9/2020 |

OTHER PUBLICATIONS

Chen, Fu-Hsin, et al. "PWL: A progressive wear leveling to minimize data migration overheads for NAND flash devices." 2015 Design, Automation & Test in Europe Conference & Exhibition (Date). IEEE, 2015. (Year: 2015).*

(Continued)

*Primary Examiner* — Nicholas J Simonetti
(74) *Attorney, Agent, or Firm* — IPro, LLC

(57) ABSTRACT

A random write method includes: using a wear-leveling module to scan the number of free blocks and the number of bad blocks in a target super logic unit; using a lookup management module to iteratively update, according to the number of current remaining solid-state disk data frames, the number of historically weighted solid-state disk data frames in a long short-term memory network manner; using dynamic write arbitration to determine an adjustment stage based on the number of historically weighted solid-state disk data frames, and determining the expected number of read and write operations per second based on the adjustment stage; and re-updating the number of historically weighted solid-state disk data frames, and adjusting the actual number (Continued)

of read and write operations per second based on the re-updated number of historically weighted solid-state disk data frames and the expected number of read and write operations per second.

14 Claims, 2 Drawing Sheets

(52) U.S. Cl.
CPC ....... *G06F 12/0246* (2013.01); *G06N 3/0442* (2023.01); *G06F 2212/7211* (2013.01)

(56) References Cited

U.S. PATENT DOCUMENTS

| | | | |
|---|---|---|---|
| 2014/0215129 A1* | 7/2014 | Kuzmin | G06F 12/0246 |
| | | | 711/103 |
| 2016/0034206 A1* | 2/2016 | Ryan | G06F 3/064 |
| | | | 711/103 |
| 2017/0060442 A1* | 3/2017 | Dunn | G06F 3/0613 |
| 2017/0123720 A1 | 5/2017 | Oe et al. | |
| 2020/0293200 A1* | 9/2020 | Das | G06F 3/0676 |

OTHER PUBLICATIONS

PCT/CN2021/073448 international search report.

\* cited by examiner

RANDOM WRITE METHOD AND APPARATUS

CROSS-REFERENCE TO RELATED APPLICATIONS

The present application claims priority to the Chinese patent application No. 202010472997.6 entitled "Random Write Method and Apparatus" filed on May 29, 2020, to the China National Intellectual Property Administration, the entire contents of which are incorporated herein by reference.

FIELD

The present application relates to the field of data storage, and more particularly to a random write method and apparatus.

BACKGROUND

In the information age of the exponential growth of data volume, the rapid and effective storage and processing of data have become an important research direction. The speed of the mechanical hard disk has been unable to meet the current computing speed of the CPU. The solid-state disk has gradually become the mainstream memory device with the advantages of fast read and write speed and small size. It is widely used in various fields of our lives. The performance of solid-state disk (SSD) has also received great attention. However, in the prior art, the processing speed of the solid-state disk random write is low and the consistency is poor such that the performance may not meet the requirements.

Currently, there is no effective solution for the problem of low processing speed and poor consistency of solid-state disk random write in the prior art.

SUMMARY

In view of the above, it is an object of embodiments of the present application to provide a random write method and apparatus capable of improving the performance of input/output per second and the data consistency of solid-state disk random write.

Based on the above object, the first aspect of an embodiment of the present application provides a random write method, including executing the following steps:

determining, by a wear-leveling module, in a manner of leveling a remaining space, a target super logic unit from among a plurality of super logic units in a solid-state disk;

scanning, by the wear-leveling module, a quantity of free blocks and a quantity of bad blocks in the target super logic unit so as to determine a quantity of current remaining solid-state disk data frames;

iteratively updating, by a lookup management module, according to the quantity of the current remaining solid-state disk data frames, a quantity of historically weighted solid-state disk data frames in a long short-term memory network manner;

by dynamic write arbitration, determining an adjustment stage on the basis of the quantity of the historically weighted solid-state disk data frames, and determining the expected number of times of read and write operations per second on the basis of the adjustment stage; and re-updating the quantity of the historically weighted solid-state disk data frames, and adjusting the actual number of times of read and write operations per second on the basis of the re-updated quantity of the historically weighted solid-state disk data frames and the expected number of times of read and write operations per second.

In some implementation modes, determining, by a wear-leveling module, in a manner of leveling a remaining space, a target super logic unit from among a plurality of super logic units in a solid-state disk includes:

determining whether a quantity of the super logic units with the minimum quantity of the free blocks in the solid-state disk exceeds a predetermined threshold value; and selecting the super logic units with the minimum quantity of the free blocks as the target super logic unit in response to exceeding the predetermined threshold value.

In some implementation modes, determining, by a wear-leveling module, in a manner of leveling a remaining space, a target super logic unit from among a plurality of super logic units in a solid-state disk further includes:

in response to not exceeding the predetermined threshold value, scanning whether there is at least one super logic unit in a free state in the solid-state disk; and determining one of the super logic units as a target super logic unit in response to the presence of at least one super logic unit in the free state.

In some implementation modes, iteratively updating, by a lookup management module, according to the quantity of the current remaining solid-state disk data frames, a quantity of historically weighted solid-state disk data frames in a long short-term memory network manner includes:

weighting a quantity of old weighted solid-state disk data frames according to a predetermined historical average weighted parameter; and executing a normalized weighted average on the weighted quantity of the old weighted solid-state disk data frames and the quantity of standard weighted current remaining solid-state disk data frames to obtain the updated quantity of the historically weighted solid-state disk data frames.

In some implementation modes, the dynamic write arbitration includes three stages. Each stage includes a corresponding relationship between the quantity of the free blocks, the quantity of the historically weighted solid-state disk data frames, and the number of times of read and write operations per second.

By dynamic write arbitration, determining an adjustment stage on the basis of the quantity of the historically weighted solid-state disk data frames, and determining the expected number of times of read and write operations per second on the basis of the adjustment stage includes: by a dynamic write arbitration, determining a stage in which a corresponding number of times of read and write operations per second is located as an adjustment stage on the basis of the quantity of the historically weighted solid-state disk data frames, and determining the expected number of times of read and write operations per second on the basis of the adjustment stage and the quantity of the historically weighted solid-state disk data frames.

The second aspect of an embodiment of the present application provides a random write apparatus, including:

a processor; and a memory storing a program code executable by the processor, wherein the program code, when executed, executes the following steps:

determining, by a wear-leveling module, in a manner of leveling a remaining space, a target super logic unit from among a plurality of super logic units in a solid-state disk;

scanning, by the wear-leveling module, a quantity of free blocks and a quantity of bad blocks in the target super logic unit so as to determine a quantity of current remaining solid-state disk data frames;

iteratively updating, by a lookup management module, according to the quantity of the current remaining solid-state disk data frames, a quantity of historically weighted solid-state disk data frames in a long short-term memory network manner;

by dynamic write arbitration, determining an adjustment stage on the basis of the quantity of the historically weighted solid-state disk data frames, and determining an expected number of times of read and write operations per second on the basis of re-updated adjustment stage; and re-updating the quantity of the historically weighted solid-state disk data frames, and adjusting an actual number of times of read and write operations per second on the basis of the quantity of the historically weighted solid-state disk data frames and the expected number of times of read and write operations per second.

In some implementation modes, determining, by a wear-leveling module, in a manner of leveling a remaining space, a target super logic unit from among a plurality of super logic units in a solid-state disk further includes:

determining whether a quantity of the super logic units with a minimum quantity of the free blocks in the solid-state disk exceeds a predetermined threshold value; and selecting the super logic unit with the minimum quantity of the free blocks as the target super logic unit in response to exceeding the predetermined threshold value.

In some implementation modes, determining, by a wear-leveling module, in a manner of leveling a remaining space, a target super logic unit from among a plurality of super logic units in a solid-state disk further includes:

in response to not exceeding the predetermined threshold value, scanning whether there is at least one super logic unit in a free state in the solid-state disk; and determining one of the super logic units as the target super logic unit in response to the presence of at least one super logic unit in the free state.

In some implementation modes, iteratively updating, by a lookup management module, according to the quantity of the current remaining solid-state disk data frames, a quantity of historically weighted solid-state disk data frames in a long short-term memory network manner includes:

weighting a quantity of old weighted solid-state disk data frames according to a predetermined historical average weighted parameter; and executing a normalized weighted average on the weighted quantity of the old weighted solid-state disk data frames and the quantity of standard weighted current remaining solid-state disk data frames to obtain an updated quantity of the historically weighted solid-state disk data frames.

In some implementation modes, the dynamic write arbitration includes three stages, each stage includes a corresponding relationship between a quantity of free blocks, the quantity of the historically weighted solid-state disk data frames, and the number of times of read and write operations per second; and by dynamic write arbitration, determining an adjustment stage on the basis of the quantity of the historically weighted solid-state disk data frames, and determining an expected number of times of read and write operations per second on the basis of the adjustment stage includes: by the dynamic write arbitration, determining a stage in which a corresponding number of times of read and write operations per second is located as the adjustment stage on the basis of the quantity of the historically weighted solid-state disk data frames, and determining the expected number of times of read and write operations per second on the basis of the adjustment stage and the quantity of the historically weighted solid-state disk data frames.

The present application has the following advantageous technical effects: the random write method and apparatus provided by the embodiments of the present application uses a wear-leveling module to scan the quantity of the free blocks and the quantity of the bad blocks in a target super logic unit so as to determine the number of current remaining solid-state disk data frames; uses a lookup management module to iteratively update, according to the quantity of the current remaining solid-state disk data frames, the quantity of the historically weighted solid-state disk data frames in a long short-term memory network manner; uses dynamic write arbitration to determine an adjustment stage on the basis of the quantity of the historically weighted solid-state disk data frames, and determines the expected number of times of read and write operations per second on the basis of the adjustment stage; and re-updates the quantity of the historically weighted solid-state disk data frames, and adjusts the actual number of read and write operations per second on the basis of the re-updated quantity of the historically weighted solid-state disk data frames and the expected number of times of read and write operations per second. The technical schemes may improve the performance of input/output per second of a solid-state disk random write and data consistency.

BRIEF DESCRIPTION OF THE DRAWINGS

In order to explain the embodiments of the present application or the technical solutions in the prior art more clearly, a brief description will be given below with reference to the accompanying drawings which are used in the description of the embodiments or the prior art; obviously, the drawings in the description below are merely some embodiments of the present application, and for those of ordinary skills in the art, other drawings can also be obtained from these drawings without creative efforts.

DETAILED DESCRIPTION OF THE EMBODIMENTS

In order to make the object, technical schemes, and advantages of the application clearer, the embodiments of the present application are further described in detail below in combination with specific embodiments and with reference to the drawings.

It needs to be noted that all the expressions using "first" and "second" in the embodiments of the present application are intended to distinguish two entities with the same name but different from each other or different parameters. It can be seen that "first" and "second" are merely for the convenience of expressions and should not be construed as limiting the embodiments of the present application, and the subsequent embodiments will not be described one by one herein.

Figure 1:
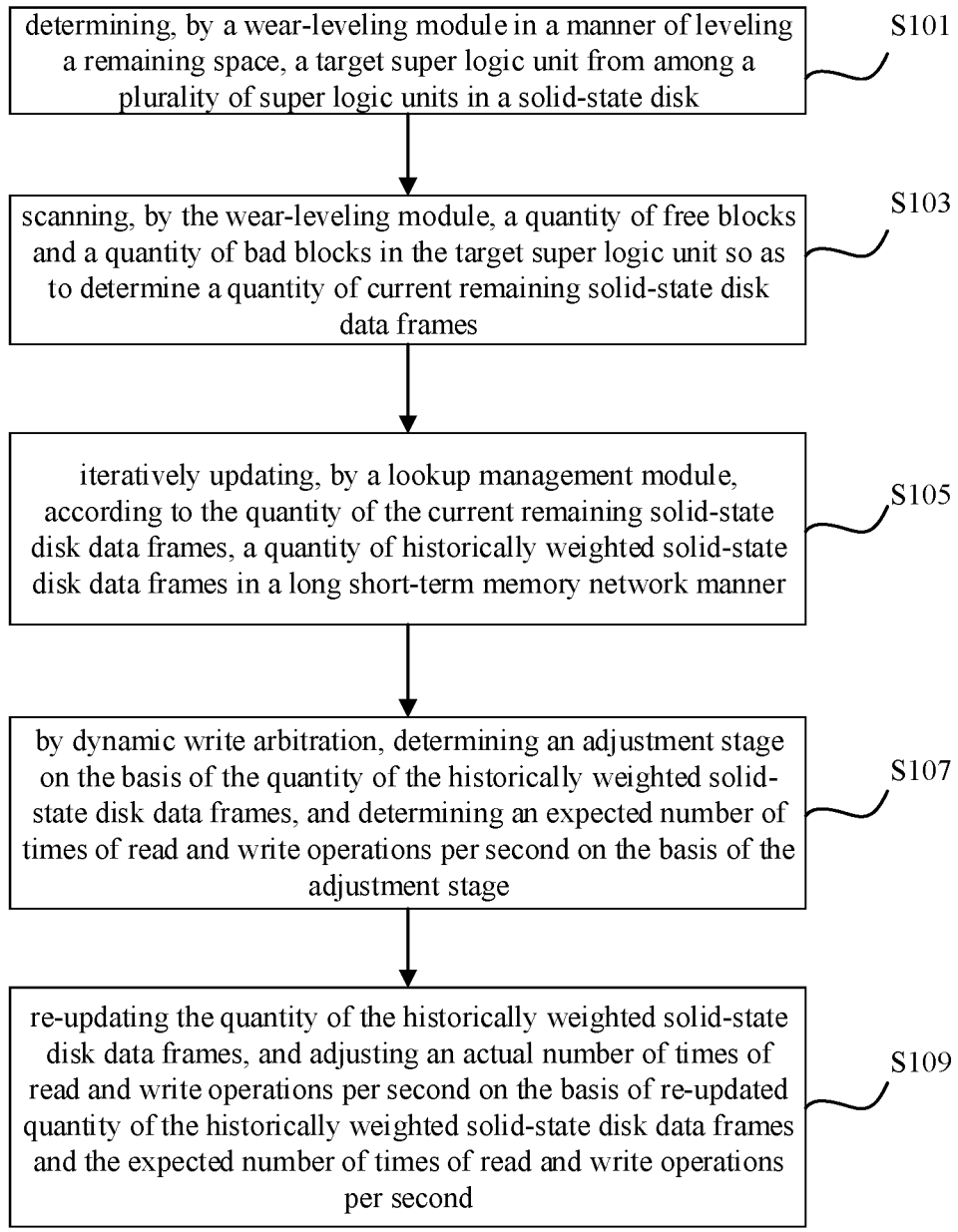
FIG. 1 is a flow chart of a random write method provided by the present application.

In view of the above object, the first aspect of an embodiment of the present application provides one embodiment of a method that may improve the performance of input/output per second and data consistency of solid-state disk random write. FIG. 1 shows a schematic flow diagram of a random write method provided by the present application.

The random write method, as shown in FIG. 1, includes executing the following steps:

step S101: determining, by a wear-leveling module, in a manner of leveling a remaining space, a target super logic unit from among a plurality of super logic units in a solid-state disk;

step S103: scanning, by the wear-leveling module, a quantity of free blocks and the quantity of bad blocks in the target super logic unit so as to determine a quantity of current remaining solid-state disk data frames;

step S105: iteratively updating, by a lookup management module, according to the quantity of the current remaining solid-state disk data frames, a quantity of historically weighted solid-state disk data frames in a long short-term memory network manner;

step S107: by dynamic write arbitration, determining an adjustment stage on the basis of the quantity of the historically weighted solid-state disk data frames, and determining the expected number of times of read and write operations per second on the basis of the adjustment stage;

and step S109: re-updating the quantity of the historically weighted solid-state disk data frames, and adjusting the actual number of times of read and write operations per second on the basis of the re-updated quantity of the historically weighted solid-state disk data frames and the expected number of times of read and write operations per second.

The present application proposes a method for effectively improving the performance of SSD random write, including improving the IOPS (the quantity of input/output per second) and consistency of random write. The present application improves the consistency of random write by calculating the number of dataframes (solid-state disk data frames) of the remaining space by means of an long short-memory network (LSTM) structure by controlling the IOPS of random write according to the free block space using a write arbitration control scheme after leveling the remaining space between super luns (super logic units).

It will be appreciated by those of ordinary skills in the art that implementing all or part of the flow of the method of the embodiment described above may be accomplished by a computer program that instructs the associated hardware. The program may be stored on a computer-readable storage medium and, when executed, may include the flow of the embodiment of the method described above. The storage medium herein may be a disk, an optical disk, a read-only memory (ROM) or a random access memory (RAM), etc. An embodiment of the computer program may achieve the same or similar effects as any of the previously described method embodiments corresponding thereto.

In some implementation modes, determining, by a wear-leveling module, in a manner of leveling a remaining space, a target super logic unit from among a plurality of super logic units in a solid-state disk includes:

determining whether a quantity of the super logic units with the minimum quantity of the free blocks in the solid-state disk exceeds a predetermined threshold value; and selecting the super logic units with the minimum quantity of the free blocks as the target super logic unit in response to exceeding the predetermined threshold value.

In some implementation modes, determining, by a wear-leveling module, in a manner of leveling a remaining space, a target super logic unit from among a plurality of super logic units in a solid-state disk further includes:

in response to not exceeding the predetermined threshold value, scanning whether there is at least one super logic unit in a free state in the solid-state disk; and determining one of the super logic units as a target super logic unit in response to the presence of at least one super logic unit in the free state.

In some implementation modes, iteratively updating, by a lookup management module, according to the quantity of the current remaining solid-state disk data frames, a quantity of historically weighted solid-state disk data frames in a long short-term memory network manner includes:

weighting a quantity of old weighted solid-state disk data frames according to a predetermined historical average weighted parameter; and executing a normalized weighted average on the weighted quantity of the old weighted solid-state disk data frames and the quantity of standard weighted current remaining solid-state disk data frames to obtain the updated quantity of the historically weighted solid-state disk data frames.

In some implementation modes, the dynamic write arbitration includes three stages. Each stage includes a corresponding relationship between the quantity of the free blocks, the quantity of the historically weighted solid-state disk data frames, and the number of times of read and write operations per second.

By dynamic write arbitration, determining an adjustment stage on the basis of the quantity of the historically weighted solid-state disk data frames, and determining the expected number of times of read and write operations per second on the basis of the adjustment stage includes: by a dynamic write arbitration, determining a stage in which a corresponding number of times of read and write operations per second is located as an adjustment stage on the basis of the quantity of the historically weighted solid-state disk data frames, and determining the expected number of times of read and write operations per second on the basis of the adjustment stage and the quantity of the historically weighted solid-state disk data frames.

The method disclosed according to an embodiment of the present application may also be implemented as a computer program executed by the CPU. The computer program may be stored in a computer-readable storage medium. When the computer program is executed by the CPU, it executes the above-described functions defined in the method described in the embodiment of the present application. The method steps and system units described above may also be implemented by using a controller, and a computer-readable storage medium for storing a computer program for causing a controller to perform the steps or the functions of the units described above.

Specific implementation modes of the present application are further described below with reference to the specific embodiments shown in FIG. 2.

Step one: the process of the wear-leveling module (WLM) leveling the remaining space between various super luns;

The remaining space between the super luns is firstly leveled, and the specific implementation is firstly to determine whether the super lun with the minimum quantity of the free blocks and the super lun with the maximum quantity of the free blocks exceed a threshold value. The threshold value may be set and is currently set as three.

If the threshold value is not exceeded, continue to determine whether the super lun is in a free state. The free state is that temporarily no free block is selected from the super lun to fill in data. The super lun in the free state is selected. If multiple super luns are in the free state, the super lun with fewer free blocks is selected.

If the threshold is exceeded, the state determination of the super lun is skipped, and the super lun with a less quantity of the free blocks is directly selected. Namely, the aimed free block is selected from the super lun to fill in data.

The above is a step of the WLM leveling the remaining space between various super luns according to the quantity of the free blocks. After leveling, the WLM calculates the current remaining dataframe number through the quantity of free blocks and the bad block table and sends the same to a lookup management module (LKM).

Step two: the LKM receives the dataframe number and recalculates the dataframe number;

After receiving the dataframe number sent by the WLM, the LKM uses the idea of LSTM to calculate the new dataframe number, which reduces the fluctuation caused by recovering new blocks and improves the consistency.

In the space at the time of calculating a steady state, in the whole writing process, the quantity of blocks changes from time to time. Let $B_1, B_2, B_3 \ldots B_n$ represent the situation where the quantity of blocks changes; according to the actual bad block situation of the block, calculate the remaining dataframe counting space as $FB_1, FB_2, FB_3 \ldots FB_n$; use $avgFB_1, avgFB_2, avgFB_3 \ldots avgFB_n$ to correspond to the historical average dataframe counting space at the time of $B_n$, and let $avgFB_1 = FB_1$, then $$avgFB_{n+1} = (\beta avgFB_n + FB_{n+1})/(\beta + 1)$$

where the value of β means that only the most recent $FB_n$ is kept for averaging, and this follows the idea of LSTM.

Specifically, with regard to how to determine β, we actually acquire the free dataframe spatial data in the process of random write from adjusting to steady state, and obtain β value through calculation, so that the fluctuation of the free dataframe data in the steady state process after the above formula calculation is small, which is basically consistent with the actual test situation. After comparison, the $avgFB_{n+1}$ fluctuation curve is close to the original graph and the fluctuation range is small when the β value is 0.9, and the change of $avgFB_{n+1}$ is small in the steady state.

Figure 2:
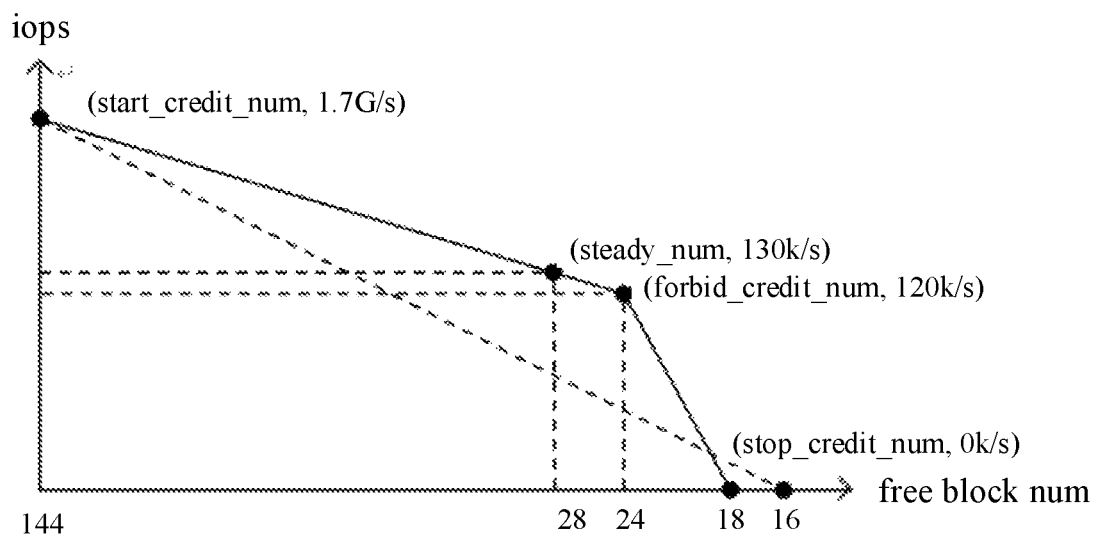
FIG. 2 is a graph of dynamic write arbitration for a random write method provided by the present application.

Step three: the IOPS is adjusted according to the curve shown in FIG. 2 according to the recalculated dataframe number $avgFB_{n+1}$.

The new write arbitration scheme is as shown by the solid line in FIG. 2. The meaning of start_credit_num is the dataframe number corresponding to the free block when the write arbitration regulation and control starts to intervene; the meaning of steady_num is the dataframe number corresponding to the free block at the steady state under the write arbitration regulation and control; the meaning of forbid_credit_num is the dataframe number corresponding to the free block when the IOPS starts to be disabled; the meaning of stop_credit_num is the dataframe number corresponding to the free block when the IOPS is reduced to 0.

The adjustment process is divided into three stages. The first stage is when the dataframe number avgFBn+1 calculated in step two is between the dataframe number corresponding to start_credit_num=144 and the dataframe number corresponding to forbid_credit_num=24, the second stage is between the dataframe number corresponding to forbid_credit_num=24 and the dataframe number corresponding to stop_credit_num=18 (the original scheme is 16), and the third stage is when the stop_credit_num=18 corresponds to a number less than the dataframe number.

According to the dataframe number $avgFBn+_1$, it is determined which stage the remaining space is in. The IOPS of the first stage and the second stage are proportional to the corresponding sides of similar triangle properties such that the corresponding IOPS of the corresponding remaining space may be obtained. The IOPS of the third stage is 0. In formula one, when the β value is 0.9, the fluctuation curve of $avgFB_{n+1}$ is close to the original graph and the fluctuation range is small. In the steady state, the change of $avgFB_{n+1}$ is small. So the fluctuation of the calculated expected IOPS is small, the adjustment is relatively smooth, and the consistency is improved.

Step four: the step-by-step adjustment is made according to the IOPS calculated in step three.

After the IOPS is calculated in step three, dynamic adjustment according to the comparison of $avgFB_{n+1}$ and the dataframe number of steady_num number in the steady state needs to be made.

When $avgFB_{n+1}$ is close to the dataframe number of the steady_num number, it is determined as a steady state. When $avgFB_{n+1}$ is greater than the set steady_num, it indicates that the steady state condition deviates from our preset condition. Then the preset IOPS is raised to be (1+δ)*IOPS, where it is temporarily determined that δ is 5%. When $B_n$ is less than the dataframe space of forbid_credit_num, it indicates that the preset IOPS is too high. So the IOPS needs to be reduced to decrease the consumption rate of the block, thereby reducing the IOPS to (1−ζ)*IOPS, where it is temporarily determined that ζ is 10%. After the method is implemented, the consistency is improved from 83% to 93%, and the performance is also improved by about 10%.

It can be seen from the above-mentioned embodiments that the random write method provided by the embodiments of the present application uses a wear-leveling module to scan the quantity of the free blocks and the quantity of the bad blocks in a target super logic unit so as to determine the quantity of the current remaining solid-state disk data frames; uses a lookup management module to iteratively update, according to the quantity of the current remaining solid-state disk data frames, the quantity of the historically weighted solid-state disk data frames in a long short-term memory network manner; uses dynamic write arbitration to determine an adjustment stage on the basis of the quantity of the historically weighted solid-state disk data frames, and determines the expected number of times of read and write operations per second on the basis of the adjustment stage; and re-updates the number of historically weighted solid-state disk data frames, and adjusts the actual number of times of read and write operations per second on the basis of the re-updated quantity of the historically weighted solid-state disk data frames and the expected number of times of read and write operations per second. The technical solutions may improve the performance of input/output per second of a solid-state disk random write and data consistency.

It needs to be particularly pointed out that the various steps in the various embodiments of the random write method described above may be interchanged, substituted, added, or deleted. Therefore, these reasonable permutations, combinations, and transformations of the random write method should also fall within the scope of the present application and should not limit the scope of the present application to the described embodiments.

In view of the above object, the second aspect of an embodiment of the present application provides one embodiment of an apparatus that may improve the performance of input/output per second and data consistency of solid-state disk random write. The random write apparatus includes:

a processor; and a memory storing a program code executable by the processor, wherein the program code, when executed, executes the following steps:

determining, by a wear-leveling module, in a manner of leveling a remaining space, a target super logic unit from among a plurality of super logic units in a solid-state disk;

scanning, by the wear-leveling module, a quantity of free blocks and a quantity of bad blocks in the target super logic unit so as to determine a quantity of current remaining solid-state disk data frames;

iteratively updating, by a lookup management module, according to the quantity of the current remaining solid-state disk data frames, a quantity of historically weighted solid-state disk data frames in a long short-term memory network manner;

by dynamic write arbitration, determining an adjustment stage on the basis of the quantity of the historically weighted solid-state disk data frames, and determining an expected number of times of read and write operations per second on the basis of re-updated adjustment stage; and re-updating the quantity of the historically weighted solid-state disk data frames, and adjusting an actual number of times of read and write operations per second on the basis of the quantity of the historically weighted solid-state disk data frames and the expected number of times of read and write operations per second.

In some implementation modes, determining, by a wear-leveling module, in a manner of leveling a remaining space, a target super logic unit from among a plurality of super logic units in a solid-state disk further includes:

determining whether a quantity of the super logic units with a minimum quantity of the free blocks in the solid-state disk exceeds a predetermined threshold value; and selecting the super logic unit with the minimum quantity of the free blocks as the target super logic unit in response to exceeding the predetermined threshold value.

In some implementation modes, determining, by a wear-leveling module, in a manner of leveling a remaining space, a target super logic unit from among a plurality of super logic units in a solid-state disk further includes:

in response to not exceeding the predetermined threshold value, scanning whether there is at least one super logic unit in a free state in the solid-state disk; and determining one of the super logic units as the target super logic unit in response to the presence of at least one super logic unit in the free state.

In some implementation modes, iteratively updating, by a lookup management module, according to the quantity of the current remaining solid-state disk data frames, a quantity of historically weighted solid-state disk data frames in a long short-term memory network manner includes:

weighting a quantity of old weighted solid-state disk data frames according to a predetermined historical average weighted parameter; and executing a normalized weighted average on the weighted quantity of the old weighted solid-state disk data frames and the quantity of standard weighted current remaining solid-state disk data frames to obtain an updated quantity of the historically weighted solid-state disk data frames.

In some implementation modes, the dynamic write arbitration includes three stages, each stage includes a corresponding relationship between a quantity of free blocks, the quantity of the historically weighted solid-state disk data frames, and the number of times of read and write operations per second. By dynamic write arbitration, determining an adjustment stage on the basis of the quantity of the historically weighted solid-state disk data frames, and determining an expected number of times of read and write operations per second on the basis of the adjustment stage includes: by the dynamic write arbitration, determining a stage in which a corresponding number of times of read and write operations per second is located as the adjustment stage on the basis of the quantity of the historically weighted solid-state disk data frames, and determining the expected number of times of read and write operations per second on the basis of the adjustment stage and the quantity of the historically weighted solid-state disk data frames.

It can be seen from the above-mentioned embodiments that the random write apparatus provided by the embodiments of the present application uses a wear-leveling module to scan the quantity of the free blocks and the quantity of the bad blocks in a target super logic unit so as to determine the quantity of the current remaining solid-state disk data frames; uses a lookup management module to iteratively update, according to the quantity of the current remaining solid-state disk data frames, the quantity of the historically weighted solid-state disk data frames in a long short-term memory network manner; uses dynamic write arbitration to determine an adjustment stage on the basis of the quantity of the historically weighted solid-state disk data frames, and determines the expected number of times of read and write operations per second on the basis of the adjustment stage; and re-updates the quantity of the historically weighted solid-state disk data frames, and adjusts the actual number of read and write operations per second on the basis of the re-updated quantity of the historically weighted solid-state disk data frames and the expected number of read and write operations per second. The technical solutions may improve the performance of input/output per second of a solid-state disk random write and data consistency.

It needs to be particularly pointed out that the above-mentioned embodiments of the random write apparatus use the embodiments of the random write method to specifically explain the operation process of each module. Those skilled in the art may easily think of applying these modules to other embodiments of the random write method. Of course, since the various steps in the random write method embodiment may be interleaved, substituted, added, or deleted, these reasonable permutations, combinations, and transformations of the random write apparatus should also fall within the scope of the present application and should not limit the scope of the present application to the described embodiments.

The above are exemplary embodiments of the present disclosure. It should be noted that various changes and modifications could be made herein without departing from the scope disclosed by the embodiments of the present application as defined by the appended claims. The functions, steps, and/or actions of the method claims in accordance with the disclosed embodiments described herein need not be executed in any particular order. Furthermore, although elements disclosed in the embodiments of the application may be described or claimed in the singular form, the plural is also contemplated unless limitation to the singular form is explicitly stated.

It should be understood that, as used herein, the singular form "one" is intended to also include the plural forms as well, unless the context clearly supports the exception. It should also be understood that "and/or" as used herein is meant to include any and all possible combinations of one or more of the associated listed items. The above embodiments of the application disclose the serial number of the embodiments only for description and do not represent the advantages and disadvantages of the embodiments.

Those of ordinary skills in the art could understand that all or part of the steps for implementing the embodiments described above may be performed by hardware or by a program that instructs the associated hardware to complete the step(s). The program may be stored on a computer-readable storage medium, such as a read-only memory, a magnetic disk, or an optical disk, etc.

Those of ordinary skills in the art should understand that the above discussion of any embodiment is intended to be exemplary only, and is not intended to suggest that the scope of the disclosed embodiments (including the claims) of the present application is limited to these examples; combinations of technical features in the above embodiments or in different embodiments are also possible under the thinking of the embodiments of the application, and many other variations of different aspects of the embodiments of the application as described above are possible, which are not provided in detail for the sake of clarity. Therefore, any omission, modification, equivalent replacement, improvement, etc. made within the spirit and principles of the embodiments of the application shall be included in the protection scope of the embodiments of the application.

The invention claimed is:

1. A random write method, comprising:
    determining, in a manner of leveling a remaining space, a target super logic unit from among a plurality of super logic units in a solid-state disk;
    scanning a quantity of free blocks and a quantity of bad blocks in the target super logic unit so as to determine a quantity of current remaining solid-state disk data frames;
    iteratively updating a quantity of historically weighted solid-state disk data frames in a long short-term memory network manner according to the quantity of the current remaining solid-state disk data frames;
    by dynamic write arbitration, determining an adjustment stage on the basis of the quantity of the historically weighted solid-state disk data frames, and determining an expected number of times of read and write operations per second on the basis of the adjustment stage;
    re-updating the quantity of the historically weighted solid-state disk data frames, and adjusting an actual number of times of read and write operations per second on the basis of re-updated quantity of the historically weighted solid-state disk data frames and the expected number of times of read and write operations per second;
    wherein the dynamic write arbitration comprises three stages, each stage comprises a corresponding relationship between the quantity of the free blocks, the quantity of the historically weighted solid-state disk data frames, and the number of times of read and write operations per second.

2. The method according to claim 1, wherein determining, in a manner of leveling a remaining space, a target super logic unit from among a plurality of super logic units in a solid-state disk comprises:
    determining whether a quantity of the super logic units with a minimum quantity of the free blocks in the solid-state disk exceeds a predetermined threshold value; and
    selecting the super logic unit with the minimum quantity of the free blocks as the target super logic unit in response to exceeding the predetermined threshold value.

3. The method according to claim 2, wherein determining, in a manner of leveling a remaining space, a target super logic unit from among a plurality of super logic units in a solid-state disk further comprises:
    in response to not exceeding the predetermined threshold value, scanning whether there is at least one super logic unit in a free state in the solid-state disk; and
    determining one of the super logic units as the target super logic unit in response to the presence of at least one super logic unit in the free state.

4. The method according to claim 1, wherein iteratively updating a quantity of historically weighted solid-state disk data frames in a long short-term memory network manner according to the quantity of the current remaining solid-state disk data frames comprises:
    weighting a quantity of old weighted solid-state disk data frames according to a predetermined historical average weighted parameter; and
    executing a normalized weighted average on the weighted quantity of the old weighted solid-state disk data frames and the quantity of standard weighted current remaining solid-state disk data frames to obtain an updated quantity of the historically weighted solid-state disk data frames.

5. A random write apparatus, comprising:
    a processor; and
    a memory storing a program code executable by the processor, wherein the program code, when executed, executes operations as follows:
    determining, in a manner of leveling a remaining space, a target super logic unit from among a plurality of super logic units in a solid-state disk;
    scanning, a quantity of free blocks and a quantity of bad blocks in the target super logic unit so as to determine a quantity of current remaining solid-state disk data frames;
    iteratively updating a quantity of historically weighted solid-state disk data frames in a long short-term memory network manner according to the quantity of the current remaining solid-state disk data frames;
    by dynamic write arbitration, determining an adjustment stage on the basis of the quantity of the historically weighted solid-state disk data frames, and determining an expected number of times of read and write operations per second on the basis of the adjustment stage;
    re-updating the quantity of the historically weighted solid-state disk data frames, and adjusting an actual number of times of read and write operations per second on the basis of the quantity of the historically weighted solid-state disk data frames and the expected number of times of read and write operations per second;
    wherein the dynamic write arbitration comprises three stages, each stage comprises a corresponding relationship between a quantity of free blocks, the quantity of the historically weighted solid-state disk data frames, and the number of times of read and write operations per second.

6. The apparatus according to claim 5, wherein determining, in a manner of leveling a remaining space, a target super logic unit from among a plurality of super logic units in a solid-state disk further comprises:
    determining whether a quantity of the super logic units with a minimum quantity of the free blocks in the solid-state disk exceeds a predetermined threshold value; and
    selecting the super logic unit with the minimum quantity of the free blocks as the target super logic unit in response to exceeding the predetermined threshold value.

7. The apparatus according to claim 6, wherein determining, in a manner of leveling a remaining space, a target super logic unit from among a plurality of super logic units in a solid-state disk further comprises:
in response to not exceeding the predetermined threshold value, scanning whether there is at least one super logic unit in a free state in the solid-state disk; and
determining one of the super logic units as the target super logic unit in response to the presence of at least one super logic unit in the free state.

8. The apparatus according to claim 5, wherein iteratively updating a quantity of historically weighted solid-state disk data frames in a long short-term memory network manner according to the quantity of the current remaining solid-state disk data frames comprises:
weighting a quantity of old weighted solid-state disk data frames according to a predetermined historical average weighted parameter; and
executing a normalized weighted average on the weighted quantity of the old weighted solid-state disk data frames and the quantity of standard weighted current remaining solid-state disk data frames to obtain an updated quantity of the historically weighted solid-state disk data frames.

9. A non-transitory computer-readable storage medium, storing a computer program that is executed executable by a processor, and upon execution by the processor, is configured to cause the processor to implement operations as follows:
determining, in a manner of leveling a remaining space, a target super logic unit from among a plurality of super logic units in a solid-state disk;
scanning a quantity of free blocks and a quantity of bad blocks in the target super logic unit so as to determine a quantity of current remaining solid-state disk data frames;
iteratively updating a quantity of historically weighted solid-state disk data frames in a long short-term memory network manner according to the quantity of the current remaining solid-state disk data frames;
by dynamic write arbitration, determining an adjustment stage on the basis of the quantity of the historically weighted solid-state disk data frames, and determining an expected number of times of read and write operations per second on the basis of the adjustment stage;
re-updating the quantity of the historically weighted solid-state disk data frames, and adjusting an actual number of times of read and write operations per second on the basis of the quantity of the historically weighted solid-state disk data frames and the expected number of times of read and write operations per second;
wherein the dynamic write arbitration comprises three stages, each stage comprises a corresponding relationship between a quantity of free blocks, the quantity of the historically weighted solid-state disk data frames, and the number of times of read and write operations per second.

10. The non-transitory computer-readable storage medium according to claim 9, wherein determining, in a manner of leveling a remaining space, a target super logic unit from among a plurality of super logic units in a solid-state disk further comprises:
determining whether a quantity of the super logic units with a minimum quantity of the free blocks in the solid-state disk exceeds a predetermined threshold value.

11. The non-transitory computer-readable storage medium according to claim 10, wherein determining, in a manner of leveling a remaining space, a target super logic unit from among a plurality of super logic units in a solid-state disk further comprises:
selecting the super logic unit with the minimum quantity of the free blocks as the target super logic unit in response to exceeding the predetermined threshold value.

12. The non-transitory computer-readable storage medium according to claim 10, wherein determining, in a manner of leveling a remaining space, a target super logic unit from among a plurality of super logic units in a solid-state disk further comprises:
in response to not exceeding the predetermined threshold value, scanning whether there is at least one super logic unit in a free state in the solid-state disk.

13. The non-transitory computer-readable storage medium according to claim 12, wherein determining, in a manner of leveling a remaining space, a target super logic unit from among a plurality of super logic units in a solid-state disk further comprises:
determining one of the super logic units as the target super logic unit in response to the presence of at least one super logic unit in the free state.

14. The non-transitory computer-readable storage medium according to claim 12, wherein iteratively updating a quantity of historically weighted solid-state disk data frames in a long short-term memory network manner according to the quantity of the current remaining solid-state disk data frames comprises:
weighting a quantity of old weighted solid-state disk data frames according to a predetermined historical average weighted parameter; and
executing a normalized weighted average on the weighted quantity of the old weighted solid-state disk data frames and the quantity of standard weighted current remaining solid-state disk data frames to obtain an updated quantity of the historically weighted solid-state disk data frames.

* * * * *